United States Patent
Gray

(10) Patent No.: US 12,544,892 B2
(45) Date of Patent: Feb. 10, 2026

(54) FASTENER SYSTEM

(71) Applicant: Grays Clip Limited, Enniskillen (GB)

(72) Inventor: David Gray, Enniskillen (GB)

(73) Assignee: GRAYS CLIP LIMITED, Enniskillen (GB)

( * ) Notice: Subject to any disclaimer, the term of this patent is extended or adjusted under 35 U.S.C. 154(b) by 4 days.

(21) Appl. No.: 18/476,049

(22) Filed: Sep. 27, 2023

(65) Prior Publication Data

US 2024/0100670 A1   Mar. 28, 2024

(30) Foreign Application Priority Data

Sep. 27, 2022   (GB) ..................... 2214093

(51) Int. Cl.
*B25C 1/00*   (2006.01)

(52) U.S. Cl.
CPC .............. *B25C 1/001* (2013.01); *B25C 1/008* (2013.01)

(58) Field of Classification Search
CPC .......... B25C 1/001; B25C 1/008; B25C 5/06; B25C 5/15; B25C 5/00; B25C 5/10; B25C 5/16; F16B 15/08; F16B 15/02; F16B 15/06; F16B 5/0685
See application file for complete search history.

(56) References Cited

U.S. PATENT DOCUMENTS

| | | |
|---|---|---|
| 2008/0156844 A1 | 7/2008 | Braganza et al. |
| 2017/0095919 A1 | 4/2017 | Chen |
| 2018/0093370 A1* | 4/2018 | Yip .......................... B25C 1/005 |
| 2018/0172052 A1* | 6/2018 | Gray ......................... F16L 3/04 |
| 2020/0276690 A1* | 9/2020 | Hegarty .................... B25C 1/06 |

FOREIGN PATENT DOCUMENTS

| | | |
|---|---|---|
| EP | 1350605 A2 | 10/2003 |
| EP | 2734338 A1 | 5/2014 |
| GB | 2516370 A | 1/2015 |
| GB | 2539105 A | 12/2016 |
| WO | 2005/084892 A1 | 9/2005 |

OTHER PUBLICATIONS

Combined Search and Examination Report for related GB2214093.3 mailed Mar. 10, 2023, 7 pages.

* cited by examiner

*Primary Examiner* — Veronica Martin
(74) *Attorney, Agent, or Firm* — Quarles & Brady LLP

(57) ABSTRACT

A fastener system comprising one or more fasteners and a fastener tool is disclosed. The fastener tool comprises a housing; an elongate magazine attached to the housing comprising an elongate partial surface between its ends configured to engage a support structure; a fastener carrying mechanism configured to carry the one or more fasteners with receptacles thereof accessible through the elongate partial surface; a pusher comprising a first end member and a second end member, the second end member providing a receptacle; and a location system formed from a receptacle of the one or more fasteners and the receptacle of the pusher second end member, each configured to locate the fastener tool over and in line with an elongate object on the support surface, and a drive system configured to drive a lead fastener to fasten the elongate object to the support surface.

20 Claims, 7 Drawing Sheets

FASTENER SYSTEM

CROSS-REFERENCE TO RELATED APPLICATION

This application claims the benefit of United Kingdom Application No. 2214093.3, filed Sep. 27, 2022, which is hereby incorporated by reference in its entirety.

The invention relates to a fastener system for fastening an elongate object to a support structure, particularly, but not exclusively, a cable or a pipe to a beam or wall or other support structure.

BACKGROUND

Various types of fasteners and fastener systems exist for fastening elongate objects, such as cables and pipes onto support surfaces. For example, electrical cables are often fastened to joists and the like by fasteners comprising a U-shaped body and a nail attached to one side of the body. Such fasteners have to be manually applied to fasten the cable to the joist, without the use of a fastener tool, such as a fastener gun. Manual application of the fasteners is time consuming and also cumbersome, with the possibility of mis-positioning of the fastener relative to the cable and nipping of the cable with the nail.

Other staple-type fasteners, and fastener tools for these, exist. These can have various issues, such as the mis-positioning of fasteners relative to the elongate object, resulting in the risk of damaging the object. In particular, the incorrect lateral positioning of fasteners relative to the elongate object can cause issues when using a fastener tool. When the elongate object is not centered with respect to the fastener, there is a risk of contacting the object with a nail. Furthermore, there is a risk of erroneously fastening the fastener to an adjacent object, such as an adjacent cable, which can cause damage to that adjacent cable.

It is an aim of the present invention to mitigate one or more of the problems of the prior art.

BRIEF SUMMARY OF THE DISCLOSURE

According to a first aspect of the invention there is provided a fastener system for fastening an elongate object to a support structure comprising:
one or more fasteners each comprising first and second columns, a bridge between first ends of the columns and a receptacle between the columns and the bridge,
a fastener tool comprising:
a housing,
an elongate magazine, attached to the housing, comprising a first end proximate a first side of a drive channel of the housing, a second end spaced from and in line with the first end, an elongate partial surface between the ends configured to engage the support structure, and a fastener carrying mechanism configured to carry the one or more fasteners with the receptacles thereof accessible through the elongate partial surface,
a pusher comprising a first end member received in the magazine proximate the first end of the magazine against the one or more fasteners to locate a lead fastener in the drive channel and a second end member attached to the housing proximate the second end of the magazine and in line with the magazine, the second end member providing a receptacle,
a location system formed from the receptacle of the one or more fasteners and the receptacle of the pusher second end member, each configured to locate the fastener tool over and in line with the elongate object on the support surface, and
a drive system configured to drive the lead fastener of the one or more fasteners in the drive channel to fasten the elongate object to the support surface.

Using the location system to locate the fastener tool over and in line with the elongate object on the support surface reduces twisting of the fastener tool relative to the elongate object and reduces mis-positioning of the fastener relative to the elongate object and the possibility of nipping of the object or an adjacent object with the fastener.

If the cable is not correctly centered for the particular fasteners used in the system, then this provides a risk of mis-alignment between the fastener and the elongate object. According to the present invention, the receptacle(s) of the one or more fasteners inside the magazine form part of the location system. This is particularly beneficial as it facilitates the centering of the cable within the fasteners themselves. Because different fasteners having different receptacle widths can be used in the system depending on the elongate object, the location system is adjustable and able to accurately center the cable for different fasteners, thus reducing the mis-positioning of the fastener.

The location system may comprise a channel for the elongate object extending between the drive channel and the pusher second end member, the channel being formed from the receptacles of the one or more fasteners and the receptacle of the pusher second end member.

In use, the fastener system is applied to the support structure such that the elongate object is located within the channel and the elongate partial surface engages the support structure on either side of the channel along the length of the channel.

Thus, the location system acts to align the elongate object along the center of the fastener receptacles along the full length of the fasteners carried by the magazine.

The fastener system may be used to fasten an elongate object comprising a cable, for example an electrical cable or a wire, to a support structure comprising any of a joist, a beam, a wall, a framework, or a floor.

The fastener system may be used to fasten an elongate object comprising a conduit or pipe, for example a hose, water pipe, or an electrical conduit, to a support structure comprising any of a joist, a beam, a wall, a framework, or a floor.

The fastener system may be used to fasten an elongate object comprising plant tissue such as a plant stalk to a support structure comprising any of a joist, a beam, a wall, a framework, or a floor.

The one or more fasteners may comprise a U-shaped receptacle. The one or more fasteners may comprise an interior width of the receptacle between the columns which fits a width of the elongate object. The one or more fasteners may comprise an exterior width between exterior edges of the columns which fits a width of the fastener carrying mechanism of the magazine. The one or more fasteners may comprise a fixed exterior width and an interior width chosen to fit the width of the elongate object. The fastener system may thus be used for fastening elongate objects of different widths.

The one or more fasteners may comprise a nail at least partially received in the first column and a nail at least partially received in the second column. The drive mechanism may be configured to drive nails of the lead fastener in the drive channel into the support surface to fasten the elongate object to the support surface.

The fastener system may comprise a safety mechanism. The safety mechanism may comprise a panel movably mounted adjacent to the drive channel. The panel may be movable between a first closed position across the receptacle of the one or more fasteners, and a second open position exposing the receptacle of the one or more fasteners. The safety mechanism may be biased towards the first closed position. In the first closed position, the safety mechanism is arranged to prevent the driving of the lead fastener. Positioning the safety mechanism across the receptacle of the one or more fasteners beneficially means that the safety is not released until the elongate object is correctly located in the receptacle and the elongate partial surface is correctly engaging the support structure.

The fastener tool may comprise a nose attached to the housing proximate a second side of the drive channel. The nose may comprise a receptacle forming part of the location system and configured to locate the fastener tool over and in line with the elongate object on the support surface. The nose may comprise a first section comprising columns, a bridge between first ends of the columns and the receptacle formed between the columns and the bridge. A lower surface of each of the columns may be coplanar and angled with respect to a plane of the elongate partial surface. The lower surface of each column may be angled upwards such that when the elongate partial surface engages with the support structure, the lower surface of each column does not engage with the support structure. The first section may comprise an interior width of the receptacle between the columns which is greater than or fits a width of the elongate object. Advantageously, providing a receptacle on the nose forming part of the location system means that the elongate object can still be correctly centered with respect to the fastener tool even in situations where the back of the fastener tool needs to be lifted. When the back of the fastener tool is lifted and so the fastener tool is tilted about the drive channel, the lower surface of each of the columns of the nose engages with the support structure. This may be required, for example, when obstructions are present on the support structure such as glue.

The nose may comprise a second section comprising a receptacle forming part of the location system and configured to locate the fastener tool over and in line with the elongate object on the support surface. The second section may be inserted between the columns of the first section and be slidable into an operative position in which the second section receptacle forms part of the location system and an inoperative position in which the first section receptacle forms part of the location system. The second section may comprise columns, a bridge between first ends of the columns and the receptacle formed between the columns and the bridge. The second section may comprise an interior width of the receptacle between the columns which is greater than or fits a width of the elongate object and which is less than the width of the receptacle of the first section.

The pusher second end member may comprise first and second side elements, a plate element between first ends of the side elements and the receptacle formed between the side elements and the plate element. The pusher second end member may comprise an interior width of the receptacle between the side elements which is greater than or fits a width of the elongate object. The fastener system may thus be used for fastening elongate objects of different widths.

The pusher first end member may comprise a receptacle forming part of the location system and configured to locate the fastener tool over and in line with the elongate object on the support surface. The pusher first end member may comprise first and second side elements, a plate element between first ends of the side elements and the receptacle formed between the side elements and the plate element. The pusher first end member may comprise an interior width of the receptacle between the side elements which is greater than or fits a width of the elongate object. The fastener system may thus be used for fastening elongate objects of different widths.

The location system thus may comprise the nose, the one or more fasteners, the first end member of the pusher and the second end member of the pusher configured to locate the fastener tool over and in line with the elongate object on the support surface. The risk of misaligning the fastener tool with the elongate object, such as by twisting the fastener tool with regard to the elongate object, is thereby reduced.

The pusher may comprise a biasing system anchored to the second end member and acting to push against the first end member to locate the first end member proximate the first end of the magazine against the one or more fasteners to locate the lead fastener in the drive channel. The biasing system may comprise first and second springs each anchored to the second end member and acting to push against the first end member.

The pusher may comprise an attachment device located on the first end member configured to attach the pusher to an attachment device of the housing. The housing attachment device may be located proximate the second end of the magazine. The housing attachment device may comprise a curved rail having a first section extending beyond and in line with the magazine and a second section extending from and at an angle to the first section. The pusher attachment device may comprise a guide which is moveable along the first section and then the second section of the rail of the housing attachment device to move the pusher away from the magazine and then pivot the pusher out of line with the magazine. This allows the pusher to be clear of the magazine for the loading of one or more fasteners, whilst maintaining attachment of the pusher and the housing, preventing the pusher from being dropped.

The elongate magazine may comprise elongate first and second side members extending between the first end and the second end of the magazine. The elongate side members may comprise elongate first ends to which is attached an elongate plate member. The elongate side members may comprise elongate second ends which form the elongate partial surface configured to engage the support structure. The elongate side members and the elongate plate member may provide a receptacle for receiving the one or more fasteners.

The fastener carrying mechanism of the magazine may comprise a first elongate lip extending inwardly from the second end of the first side member and a second elongate lip extending inwardly from the second end of the second side member. The lips may be configured to engage with columns of the one or more fasteners to carry the one or more fasteners in the magazine, with the receptacles thereof accessible through the elongate partial surface.

The drive system may comprise a hammer configured to engage with the lead fastener of the one or more fasteners in the drive channel to drive the lead fastener to fasten the elongate object to the support surface. The hammer may be shaped or otherwise adapted to engage with the first and second columns of the fastener and not the bridge of the fastener, to prevent damage to the fastener. The drive system may comprise a drive mechanism, such as a mechanically operated drive mechanism or a pneumatic drive mechanism, to drive the hammer into engagement with lead fastener. The drive mechanism may be tailored to stop the hammer at a predefined position at the columns of the fastener to prevent the fastener being overdriven.

The housing of the fastener tool may comprise a handle configured to be gripped by a user of the tool. The housing of the fastener tool may comprise an on/off device configured to be operated by a user of the tool.

According to a second aspect of the invention there is provided a fastener tool for use in the fastener system of the first aspect of the invention.

According to a third aspect of the invention there is provided a fastener for use in the fastener system of the first aspect of the invention.

BRIEF DESCRIPTION OF THE DRAWINGS

Embodiments of the fastener system will now be described, by way of example only, with reference to the accompanying drawings, in which.

DETAILED DESCRIPTION

Figure 1:
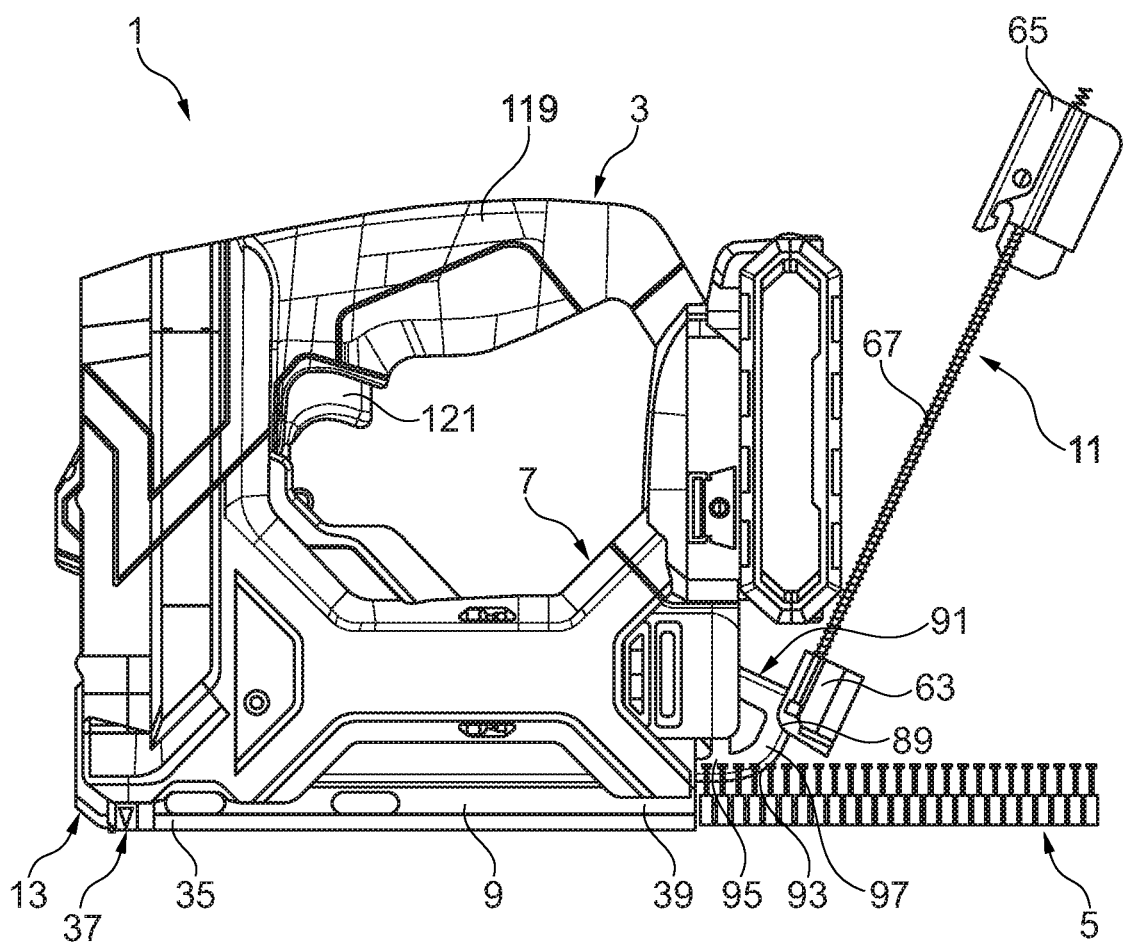
FIG. 1 is a schematic side representation of a fastener system according to the first aspect of the invention.

Referring to FIG. 1, a fastener system 1 for fastening an elongate object 2 to a support structure is shown. The fastener system 1 comprises a fastener tool 3 and fasteners 5. The fastener tool 3 comprises a housing 7, a magazine 9, a pusher 11 and a nose 13.

Figure 2A:
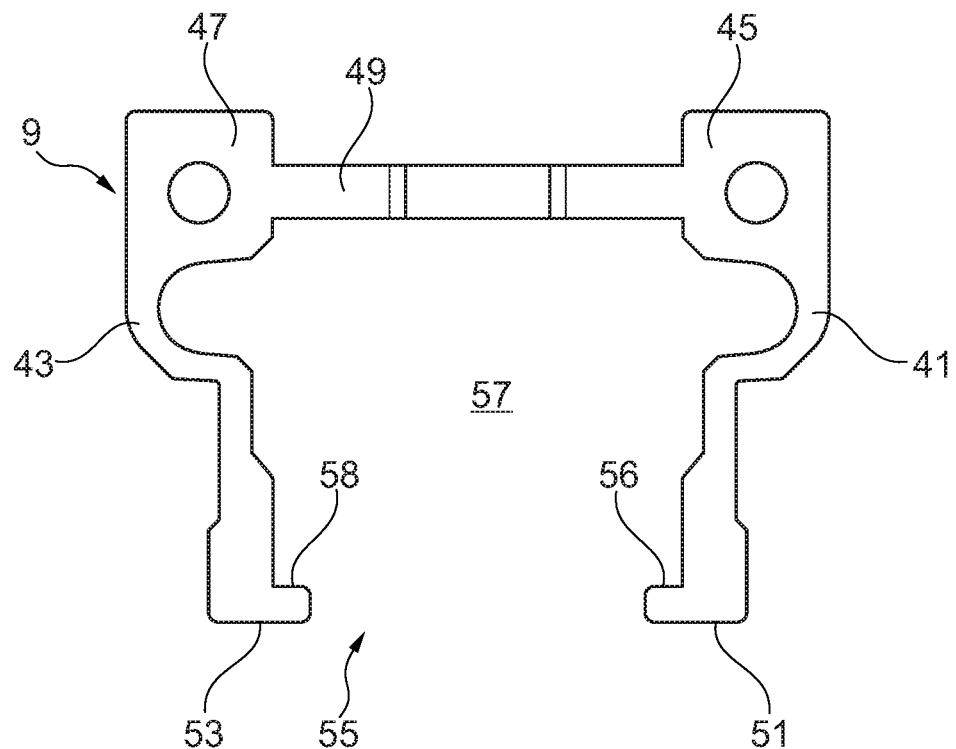
FIG. 2A is a schematic cross sectional view of a magazine of the fastener system of FIG. 1.
Figure 2B:
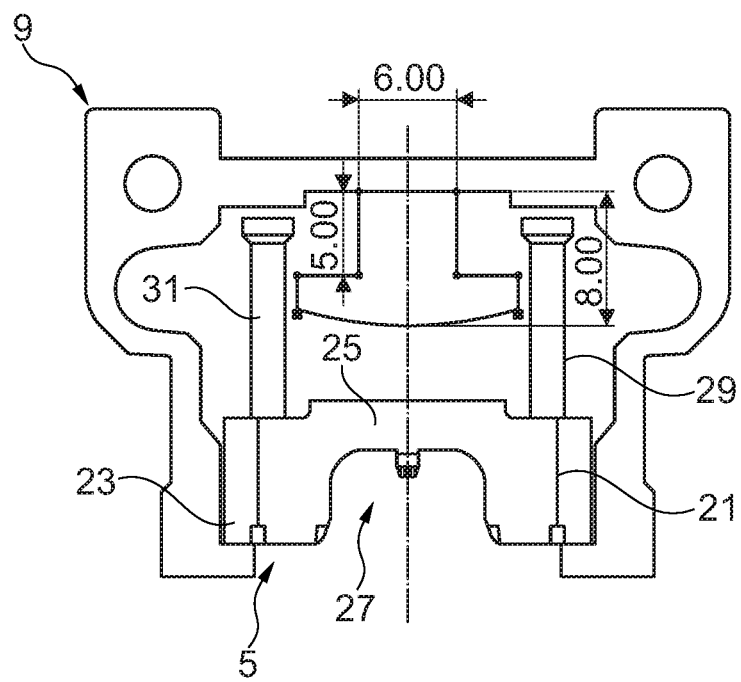
FIG. 2B is a schematic cross-sectional view of a magazine receiving a fastener of the fastener system of FIG. 1.

Referring to FIGS. 1 and 2B, the fasteners 5 each comprise first and second columns 21, 23, a bridge 25 between first ends of the columns 21, 23 and a U-shaped receptacle 27 between the columns 21, 23 and the bridge 25. The interior width of the receptacle 27 between the columns 21, 23 fits a width of the elongate object 2. The exterior width between exterior edges of the columns 21, 23 fits a width of a fastener carrying mechanism of the magazine 9 of the fastener tool 3. In a preferred embodiment, the fasteners 5 to be used with the fastener tool 3 comprise a fixed exterior width to fit a fixed width of the fastener carrying mechanism of the magazine 9. The fasteners further comprise an interior width which is chosen to fit the width of the elongate object. For example, when the elongate object is an electrical cable, this can have a width of approximately 7 mm, 8 mm, 11.5 mm, 12.5 mm, 15 mm, etc. depending on the type of electrical cable. When the elongate object is a pipe, this can have a width of approximately 15 mm, 17 mm, 24 mm, 40 mm, etc, depending on the type of pipe. However, it will be appreciated that these examples are not limiting, and the width will depend on the type of pipe or cable. The fastener system 1 may thus be used for fastening elongate objects of different widths.

The fasteners 5 comprise a nail 29 partially received in the first column 21 and a nail 31 partially received in the second column 23. In use, a drive mechanism of the fastener tool 3 is configured to drive the nails of a lead fastener in a drive channel into the support surface to fasten the elongate object to the support surface.

Referring to FIGS. 1, 2A, 2B and 5, the magazine 9 is an elongate magazine, attached to the housing 7, and comprises a first end 35 proximate a first side of a drive channel 37 of the housing 7, a second end 39 spaced from and in line with the first end 35. The elongate magazine 9 comprises a first elongate side member 41 and a second elongate side member 43 extending between the first end 35 and the second end 39 of the magazine 9. The elongate side members 41, 43 comprise elongate first ends 45, 47 to which is attached an elongate plate member 49. The elongate side members 41, 43 comprise elongate second ends 51, 53 which form an elongate partial surface configured, in use, to engage the support structure. More specifically, each of the elongate second ends 51, 53 of the elongate side members 41, 43 provides an elongate strip, configured to engage the support structure, with a gap 55 therebetween. The elongate side members 41, 43 and the elongate plate member 49 provide a receptacle 57 for receiving the fasteners 5.

The magazine 9 comprises a fastener carrying mechanism configured to carry the fasteners 5. The fastener carrying mechanism of the magazine may comprise a first elongate lip 56 extending inwardly from the second end of the first side member 41 and a second elongate lip 58 extending inwardly from the second end of the second side member 43. The lips 56, 58 may be configured to engage with columns 21, 23 of the one or more fasteners 5 to carry the one or more fasteners in the magazine 9 as shown in FIG. 2B, with the receptacles 27 thereof accessible through the elongate partial surface.

Figure 6:
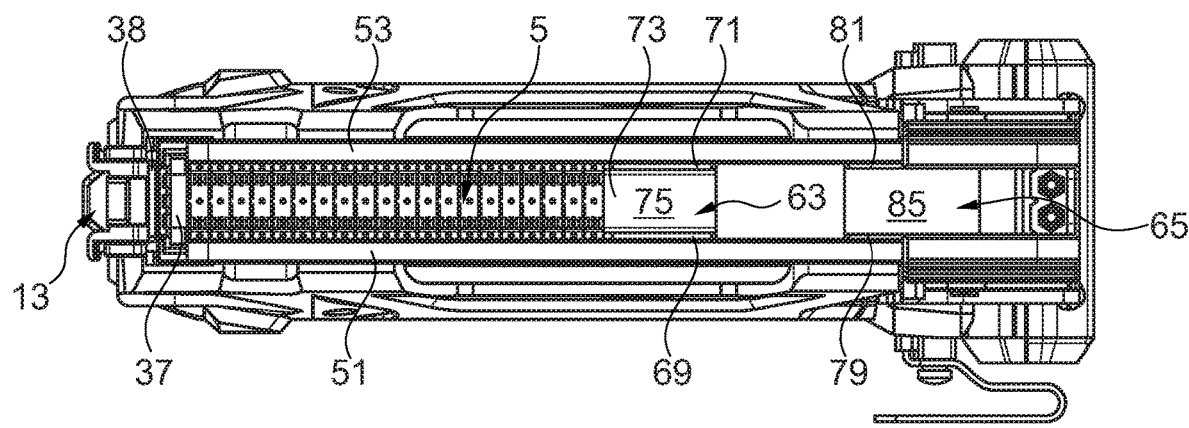
FIG. 6 is a schematic view of the underside of the fastener system of FIG. 1 including the fasteners.

Referring to FIGS. 1 and 6, the pusher 11 comprises a first end member 63. In use, the first end member 63 is received in the magazine 9 proximate the first end 35 of the magazine 9 against the fasteners 5 to locate a lead fastener (not shown) in the drive channel 37. The pusher 11 further comprises a second end member 65. In use, the second end member 65 is attached to the housing 7 proximate the second end 39 of the magazine 9 and in line with the magazine 9. The pusher 11 further comprises a biasing system 67, comprising first and second springs, anchored to the second end member 65 and acting to push against the first end member 63 to locate the first end member 63 proximate the first end 35 of the magazine 9 against the fasteners 5.

With reference to FIG. 6, the pusher first end member 63 comprises a first side element 69 and a second side element 71 and a plate element 73 between first ends of the side elements 69, 71. The receptacle of the pusher first end member 63, receptacle 75, is formed between the side elements 69, 71 and the plate element 73. In use, the pusher first end member 63 is received in the magazine 9 such that the receptacle 75 is accessible through the elongate partial surface of the magazine 9. In the pusher first end member 63, the interior width of the receptacle 75 between the side elements 69, 71 is greater than or fits a width of the elongate object. The interior width of the receptacle 75 may be chosen to fit a maximum width elongate object and will thus tightly fit this object and fit over elongate objects having widths less than the maximum width elongate object. The fastener system 1 may thus be used for fastening elongate objects of different widths.

Figure 3:
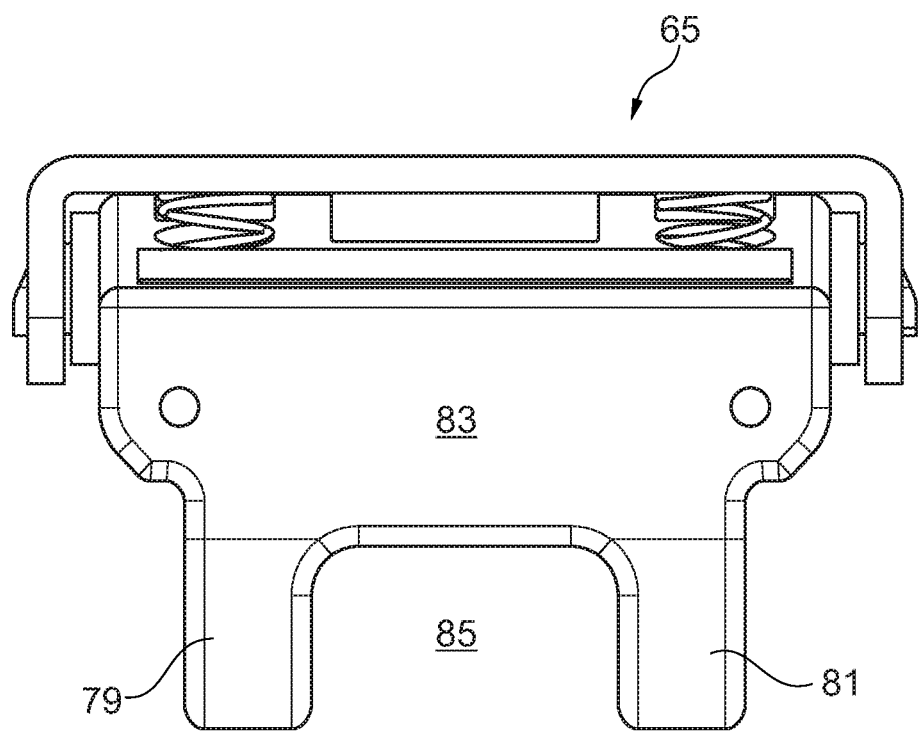
FIG. 3 is a schematic rear representation of a pusher second end member of the fastener system of FIG. 1.

With reference to FIGS. 3 and 6, the pusher second end member 65 comprises a receptacle 85 forming part of the location system and configured to locate the fastener tool 3 over and in line with the elongate object on the support surface. The pusher second end member 65 comprises a first side element 79, a second side element 81 and a plate element 83 between first ends of the side elements 79, 81. The receptacle of the pusher second end member 65, receptacle 85, is formed between the side elements 79, 81 and the plate element 83. The pusher second end member 65 comprises an interior width of the receptacle 85 between the side elements 79 81 which is greater than or fits a width of the elongate object. The interior width of the receptacle 85 may be chosen to fit a maximum width elongate object and will thus tightly fit this object and fit over elongate objects having widths less than the maximum width elongate object. The fastener system 1 may thus be used for fastening elongate objects of different widths.

Referring to FIG. 1, the pusher 11 further comprises an attachment device 89 located on the first end member 63, configured to attach the pusher 11 to an attachment device 91 of the housing 7. The housing attachment device 91 is located proximate the second end 39 of the magazine 9. The housing attachment device 91 comprises a curved rail 93 having a first section 95 extending beyond and in line with the magazine 9 and a second section 97 extending from and at an angle to the first section 95. The pusher attachment device 89 comprises first and second guides (not shown) which are moveable along the first section 95 and then the second section 97 of the rail 93 of the housing attachment device 91. This moves the pusher 11 away from the magazine 9 and then pivots the pusher 11 out of line with the magazine 9, as shown. This allows the pusher 11 to be clear of the magazine 9 for the loading of fasteners 5, whilst maintaining attachment of the pusher 11 and the housing 7, preventing the pusher 11 from being dropped, whilst loading of the fasteners 5.

The pusher 11 further comprises a second attachment device (not shown) located on the second end member 65, configured to attach the second end member to the attachment device 91 of the housing 7, when the first end member 63 of the pusher 11 is received in the magazine 9. The second attachment device comprises a catch and release element for releasably attaching the second end member 65 of the pusher 11 to the housing 7.

Figure 4A:
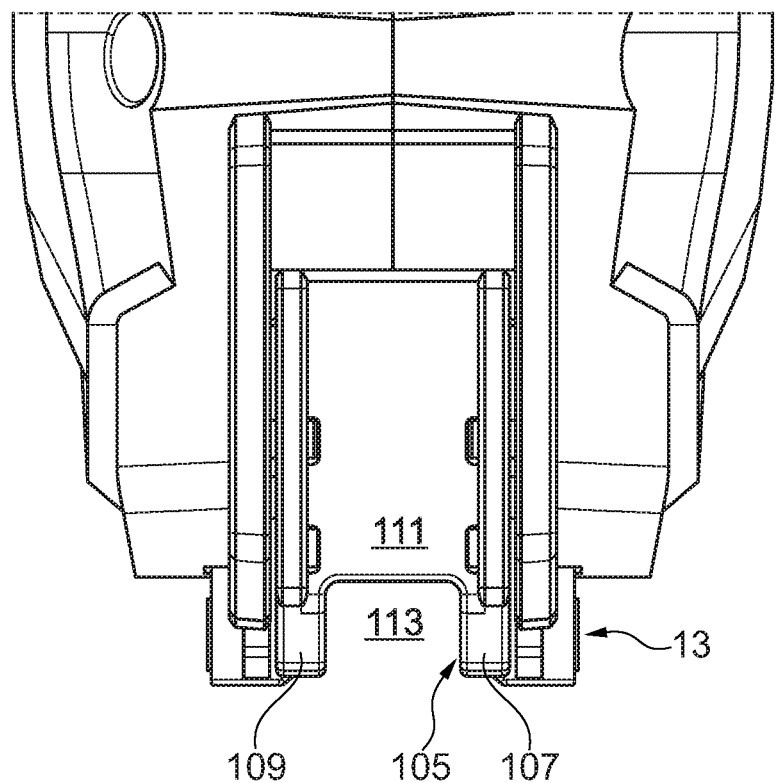
FIG. 4A is a schematic front representation of a nose of the fastener system of FIG. 1 having a second section in an operative position.
Figure 4B:
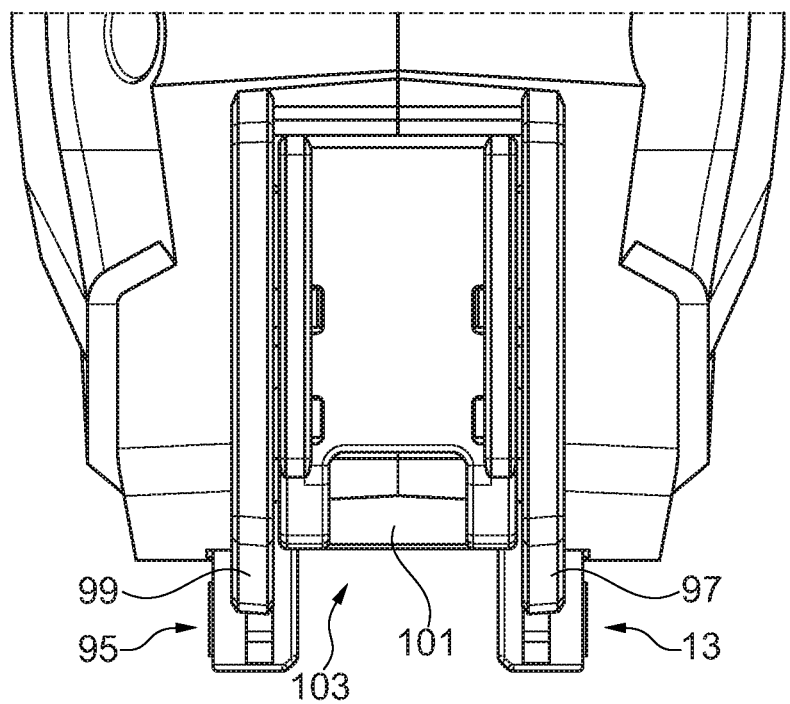
FIG. 4B is a schematic front representation of a nose of the fastener system of FIG. 1 having the second section in an inoperative position.

Referring to FIGS. 1, 4A and 4B, the fastener tool 3 comprises a nose 13. This is attached to the housing 7 proximate a second side of the drive channel 39. The nose 13 comprises a receptacle forming part of the location system and configured to locate the fastener tool over and in line with the elongate object on the support surface. The nose comprises a first section 95 comprising columns 97, 99 and a bridge 101 between first ends of the columns 97, 99. The receptacle of the nose, receptacle 103, is formed between the columns 97, 99 and the bridge 101. The first section 95 comprises an interior width of the receptacle 103 between the columns 97, 99 which is greater than or fits a width of the elongate object. The interior width of the receptacle 103 may be chosen to fit a maximum width elongate object and will thus tightly fit this object and fit over elongate objects having widths less than the maximum width elongate object.

A lower surface of each of the columns 97, 99 is coplanar and angled with respect to a plane of the elongate partial surface 51, 53. This relative angle can be seen from a side perspective in FIG. 1. The lower surface of each column 97, 99 may be angled upwards such that when the elongate partial surface 51, 53 of the magazine 9 engages with the support structure, the lower surface of each column does not engage with the support structure. Then, when the fastener tool 3 is tilted forwards about the drive channel 37, the lower surface of each column 97, 99 engages with the support structure on either side of the elongate object. This enables the elongate object to still be correctly centered with respect to the fastener tool by the columns 97, 99 even in situations where the back of the fastener tool needs to be lifted. When the back of the fastener tool is lifted and so the fastener tool is tilted about the drive channel, the elongate object is located in the receptacle of fewer fasteners as the fasteners towards the back of the system will be tilted away from the elongate object. To compensate, in the tilted position, the lower surface of each of the columns of the nose engages with the support structure. This may be required, for example, when obstructions are present on the support structure such as glue.

The nose 13 comprises a second section 105 which also comprises a receptacle 113 which may form part of the location system and be configured to locate the fastener tool 3 over and in line with the elongate object on the support surface. The second section 105 is inserted between the columns 97, 99 of the first section 95 and is slidable into an operative position, as shown in FIG. 4A, in which the second section receptacle 113 forms part of the location system and an inoperative position, as shown in FIG. 4B, in which the first section receptacle 103 forms part of the location system. The second section 105 comprise columns 107, 109 and a bridge 111 between first ends of the columns 107, 109. The receptacle of the second section 105, receptacle 113, is formed between the columns 107, 109 and the bridge 111. The second section 105 comprises an interior width of the receptacle 113 between the columns 107, 109 which is less than the width of the receptacle 103 of the first section 95. The interior width of the receptacle 113 may be chosen to fit a width of an elongate object which is less than the maximum width elongate object and will thus tightly fit this object and fit over elongate objects having widths less than this width of elongate object. When the second section 105 is in the operative position, as in FIG. 4A, the columns 107, 109 provide equivalent function to the columns 97, 99 as described above.

The housing 7 of the fastener tool 3 contains a drive system (not shown). The drive system is configured to drive a lead fastener of the fasteners 5 in the drive channel 37 to fasten the elongate object to the support surface.

Figure 8:
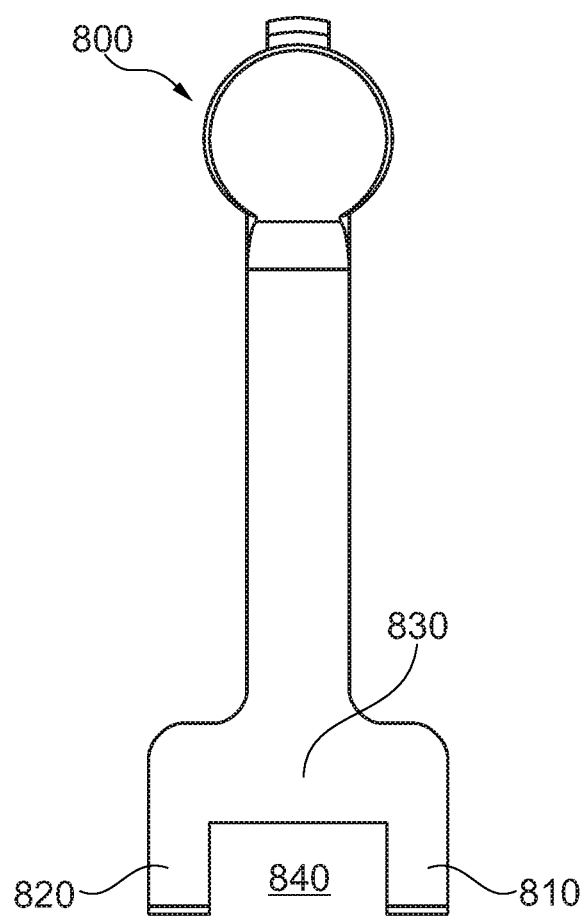
FIG. 8 is a schematic view of a hammer of the fastener system of FIG. 1.

With reference to FIG. 8, the drive system comprises a hammer 800 illustrated in isolation. The hammer 800 is configured to engage with the lead fastener in the drive channel to drive the lead fastener to fasten the elongate object to the support surface. The drive system further comprises a drive mechanism (not shown), such as a pneumatic drive mechanism with gears and electronic circuitry (not shown), to drive the hammer 800 into engagement with lead fastener.

The hammer 800 comprises a first side member 810, a second side member 820 and a bridge 830 connecting a top end of the first side member 810 to a top end of the second side member 820. Together, the first side member 810, the second side member 820 and the bridge 830 define a receptacle 840. A width of the receptacle 840 is dimensioned to correspond to the width of the bridge 25 of the fasteners 5. When the hammer 800 is driven, the first side member 810 engages with the nail 29 and drives the nail 29 through the first column 21 into the support surface. The second side member 820 engages with the nail 31 to drive the nail 31 through the second column 23 into the support surface. The gap provided by the receptacle 840 between the side members 810, 820 ensures that the hammer 800 does not engage with the bridge 25 of the fastener 5.

The fastener tool 3 comprises a battery power source 117, attached to the housing 7, for the drive system. It will be appreciated that other power sources may be used, such as a mains electricity power source.

The housing 7 of the fastener tool 3 comprises a handle 119 configured to be gripped by a user of the tool 3. The housing 7 of the fastener tool 3 comprises a firing device, in the form of a button 121, configured to be operated by a user of the tool 3.

Figure 5:
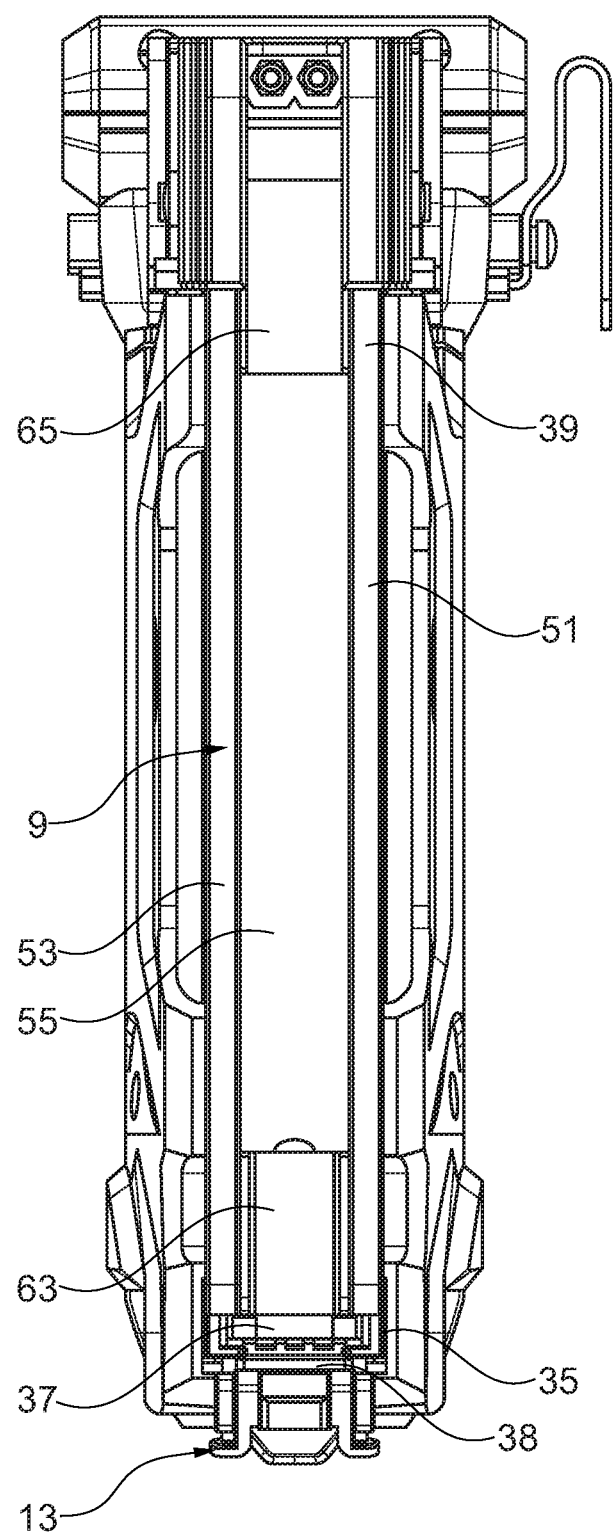
FIG. 5 is a schematic view of an underside of the fastener system of FIG. 1 having the fasteners removed.

In use, a user of the fastener system 1 checks if fasteners are in the tool 3. If this is not the case, the user disengages the second attachment device (not shown) located on the second end member 65 of the pusher 11 from the attachment device 91 of the housing 7. The user then pulls the pusher 11 out of the magazine 9, allowing the attachment device 89 located on the first end member 63 of the pusher 11 to move along the first section 95 and then the second section 97 of the rail 93 of the housing attachment device 91. This moves the pusher 11 away from the magazine 9 and then pivots the pusher 11 out of line with the magazine 9. The pusher 11 is then clear of the magazine 9 and the user loads a strip of fasteners 5 into the magazine 9. The user then pushes the first end element 63 of the pusher 11 into the magazine 9 and engages the second attachment device (not shown) located on the second end member 65 of the pusher 11 with the attachment device 91 of the housing 7. With the pusher 11 received in the magazine 9 in this way, the biasing system 67 anchored to the second end member 65 of the pusher 11 acts to push against the first end member 63 of the pusher 11, to locate the first end member 63 proximate the first end 35 of the magazine 9 against the fasteners 5. This locates the lead fastener in the drive channel 37 of the housing 7 and the fastener system 1 is ready for attachment of the elongate object to the support surface. FIGS. 5 and 6 illustrate views of the underside of the fastener system 1 before and after inserting the fasteners 5.

Figure 7:
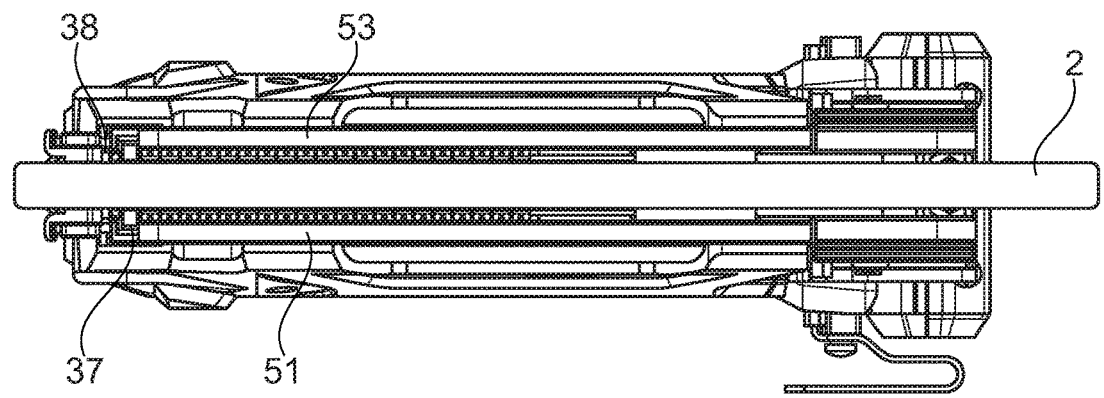
FIG. 7 is a schematic view of the underside of the fastener system of FIG. 1 engaging with an elongate object.

The user then grips the handle 119 of the housing 7 of the fastener tool 3 and locates the tool 3 on the support surface, such that each of the elongate second ends 51, 53 of the elongate side members 41, 43 of the magazine 9, which comprise elongate strips are configured to engage the support surface on either side of the elongate object, with the elongate object 2 positioned in the gap 55 between second ends 51, 53 of the elongate side members 41, 43 of the magazine 9, as shown in FIG. 7. The user positions the fastener tool 3 such that the location system, comprising the nose 13, the fasteners 5, the first end member 63 of the pusher 11 and the second end member 65 of the pusher 11, locates the tool 3 over and in line with the elongate object on the support surface.

The user then presses the button 121. This causes the drive system to drive the lead fastener in the drive channel 37 of the housing 7 to fasten the elongate object to the support surface. The nails of the lead fastener are partially driven into the support surface, to attach the elongate object to the surface. After the lead fastener has been fastened to the support surface, the biasing system 67, acting to push against the first end member 63 of the pusher 11 against the fasteners 5, locates a next fastener of the strip of fasteners in the drive channel 37 of the housing 7 and the fastener system 1 is again ready for attachment of the elongate object to the support surface. The user then moves the fastener tool 3 along the elongate object and presses the button 121. This causes the drive system to drive the new lead fastener in the drive channel 37 of the housing 7 to fasten the elongate object to the support surface at a second position of the object. The user repeats this action until the elongate object has been attached to the support surface at sufficient positions or until the strip of fasteners have all been used.

The fastener system 1 comprises a safety mechanism 38 as shown in FIGS. 5 to 7. The safety mechanism comprises a panel movably mounted adjacent to the drive channel 37 between a first closed position across the receptacle of the one or more fasteners 5, and a second open position exposing the receptacle of the one or more fasteners 5. In the first closed position, the safety mechanism is arranged to prevent the driving of the lead fastener even if the button 121 is pressed.

The safety mechanism is biased towards the first closed position such that when the fastener system 1 is not in use, such as in FIG. 6, the safety mechanism prevents the operation of the drive system. Because the safety mechanism is positioned across the receptacle 27, the elongate object 2 must be correctly positioned by the location system in the receptacle 27 of the lead fastener 5 before the drive system is activated. This prevents driving of the lead fastener 5 when the elongate object 2 is misaligned or when any adjacent object forms an obstruction which prevents the elongate object 2 being fully located in the receptacle 27.

Using the location system to locate the fastener tool 3 over and in line with the elongate object on the support surface reduces twisting of the fastener tool 3 relative to the elongate object and reduces mis-positioning of the fasteners 5 relative to the elongate object and the possibility of damaging of the object or an adjacent object with the fastener.

The fastener system 1 may be used to fasten an elongate object 2 comprising a cable, for example an electrical cable or communications cable, to a support structure comprising any of a joist, a beam, a wall, a floor or a framework.

The fastener system 1 may be used to fasten an elongate object 2 comprising a pipe, for example a water pipe or a conduit, such as a hose or conduit containing a cable, to a support structure comprising any of a joist, a beam, a wall, a floor or a framework.

The fastener system 1 may be used to fasten an elongate object 2 comprising plant tissue such as a plant stalk to a support structure comprising any of a joist, a beam, a wall, a framework, or a floor.

The invention claimed is:

1. A fastener system for fastening one of a plurality of elongate objects of different widths to a support structure, the fastener system comprising:
   one or more fasteners selected from a plurality of fasteners, each fastener comprising a first column and a second column, a bridge between a first end of the first column and a first end of the second column, and a receptacle between the first column and the second column and the bridge, wherein a selection of one or more fasteners is based on a width of an elongate object to be fastened such that the receptacle provides a close fit to the width of the elongate object to be fastened; and
   a fastener tool comprising:
      a housing;
      an elongate magazine, attached to the housing, comprising a first end proximate a first side of a drive channel of the housing, a second end spaced from and in line with the first end, an elongate partial surface between the ends configured to engage the support structure, and a fastener carrying mechanism configured to carry the one or more fasteners with the receptacles thereof accessible through the elongate partial surface;

a pusher comprising a first end member received in the elongate magazine proximate the first end of the elongate magazine against the one or more fasteners to locate a lead fastener in the drive channel and a second end member attached to the housing proximate the second end of the elongate magazine and in line with the elongate magazine, the second end member providing a receptacle;

a location system formed from the receptacle of the one or more fasteners and the receptacle of the second end member of the pusher, each configured to locate the fastener tool over and in line with the elongate object on the support structure; and a drive system configured to drive the lead fastener of the one or more fasteners in the drive channel to fasten the elongate object to the support structure, wherein the elongate magazine comprises elongate first and second side members extending between the first end and the second end of the elongate magazine;

wherein the elongate first and second side members comprise elongate first ends to which is attached an elongate plate member, and elongate second ends which form the elongate partial surface configured to engage the support structure;

wherein the elongate first and second side members and the elongate plate member provide a receptacle for receiving the one or more fasteners;

wherein the fastener carrying mechanism of the elongate magazine comprises:
  a first elongate lip extending inwardly from the second end of the first side member; and
  a second elongate lip extending inwardly from the second end of the second side member;
  wherein the first elongate lip and the second elongate lip are configured to engage with the first column and the second column of the one or more fasteners to carry the one or more fasteners in the elongate magazine, with the receptacles thereof accessible through the elongate partial surface.

2. The fastener system according to claim 1, wherein the location system comprises a channel for the elongate object extending between the drive channel and the second end member of the pusher, the channel being formed from the receptacles of the one or more fasteners and the receptacle of the second end member of the pusher.

3. The fastener system according to claim 1, wherein the fastener system is for fastening the elongate object comprising a cable, conduit or pipe to the support structure comprising a joist, a beam, a wall, a framework, or a floor.

4. The fastener system according to claim 1, wherein the one or more fasteners comprise a U-shaped receptacle.

5. The fastener system according to claim 1, wherein the one or more fasteners comprise an exterior width between exterior edges of the first column and the second column which fits a width of the fastener carrying mechanism of the elongate magazine.

6. The fastener system according to claim 1, wherein the one or more fasteners comprise a fixed exterior width and an interior width chosen to fit the width of the elongate object.

7. The fastener system according to claim 1, wherein the one or more fasteners comprise a nail at least partially received in the first column and a nail at least partially received in the second column.

8. The fastener system according to claim 7, wherein the drive mechanism is configured to drive nails of the lead fastener in the drive channel into the support structure to fasten the elongate object to the support structure.

9. The fastener system according to claim 1, wherein the fastener system comprises a safety mechanism comprising a panel movably mounted adjacent to the drive channel between a first closed position across the receptacle of the one or more fasteners, and a second open position exposing the receptacle of the one or more fasteners.

10. The fastener system according to claim 1, wherein the fastener tool comprises a nose attached to the housing proximate a second side of the drive channel, wherein the nose comprises a receptacle forming part of the location system and configured to locate the fastener tool over and in line with the elongate object on the support structure.

11. The fastener system according to claim 10, wherein the nose comprises a first section comprising:
  columns; and
  a bridge between first ends of the columns; wherein the receptacle is formed between the columns and the bridge; and
  wherein the first section comprises an interior width of the receptacle between the columns which is greater than or fits a width of the elongate object.

12. The fastener system according to claim 11, wherein the nose comprises a second section comprising:
  a receptacle forming part of the location system and configured to locate the fastener tool over and in line with the elongate object on the support structure,
  wherein the second section is inserted between the columns of the first section and is slidable into an operative position in which the second section receptacle forms part of the location system and an inoperative position in which the first section receptacle forms part of the location system.

13. The fastener system according to claim 12, wherein the second section comprises:
  columns; and
  a bridge between first ends of the columns and the receptacle formed between the columns and the bridge;
  wherein the second section comprises an interior width of the receptacle between the columns which is greater than or fits a width of the elongate object and which is less than the width of the receptacle of the first section.

14. The fastener system according to claim 1, wherein the second end member of the pusher comprises first and second side elements, a plate element between first ends of the first and second side elements and the receptacle formed between the first and second side elements and the plate element.

15. The fastener system according to claim 14, wherein the second end member of the pusher comprises an interior width of the receptacle between the first and second side elements which is greater than or fits a width of the elongate object.

16. The fastener system according to claim 14, wherein the first end member of the pusher comprises a receptacle accessible through the elongate partial surface of the elongate magazine forming part of the location system and configured to locate the fastener tool over and in line with the elongate object on the support structure, wherein the first end member of the pusher comprises:
  first and second side elements;
  a plate element between first ends of the first and second side elements; and the receptacle formed between the first and second side elements and the plate element; and wherein the first end member of the pusher comprises an interior width of the receptacle between the first and second side elements which is greater than or fits a width of the elongate object.

17. The fastener system according to claim 1, wherein the pusher comprises a biasing system anchored to the second end member and acting to push against the first end member to locate the first end member proximate the first end of the elongate magazine against the one or more fasteners to locate the lead fastener in the drive channel.

18. The fastener system according to claim 1, wherein the pusher comprises an attachment device located on the first end member configured to attach the pusher to an attachment device of the housing.

19. The fastener system according to claim 18, wherein:
the attachment device of the housing comprises a curved rail having a first section extending beyond and in line with the elongate magazine and a second section extending from and at an angle to the first section; and wherein the attachment device of the pusher comprises a guide which is moveable along the first section and then the second section of the curved rail of the attachment device of the housing to move the pusher away from the elongate magazine and pivot the pusher out of line with the elongate magazine.

20. The fastener system according to claim 1, wherein the drive system comprises:
a hammer configured to engage with the lead fastener of the one or more fasteners in the drive channel to drive the lead fastener to fasten the elongate object to the support structure; and a drive mechanism to drive the hammer into engagement with lead fastener.

* * * * *